United States Patent [19]

Walden et al.

[11] Patent Number: 5,526,904

[45] Date of Patent: Jun. 18, 1996

[54] FLOATING CALIPER BRAKE, ESPECIALLY A FLOATING CALIPER SPOT TYPE DISC BRAKE

[75] Inventors: Michael Walden, Andernach; Harald Boldt, Dernbach, both of Germany

[73] Assignee: Lucas Industries public limited company, Solihull, Great Britain

[21] Appl. No.: 536,679

[22] Filed: Sep. 29, 1995

Related U.S. Application Data

[63] Continuation of Ser. No. 220,519, Mar. 31, 1994, abandoned.

[30] Foreign Application Priority Data

Apr. 15, 1993 [DE] Germany .................. 9305631 U

[51] Int. Cl.⁶ .................................................. F16D 65/14
[52] U.S. Cl. .................................. 188/73.45; 188/73.44
[58] Field of Search ............................ 188/71.8, 73.39, 188/73.44, 73.45, 196 P

[56] References Cited

U.S. PATENT DOCUMENTS

| | | | |
|---|---|---|---|
| 4,313,526 | 2/1982 | Farr | 188/73.45 |
| 4,446,948 | 5/1984 | Melinat | 188/73.45 |
| 4,557,354 | 12/1985 | Sakakibara | 188/73.45 |
| 4,781,273 | 11/1988 | Fujinami | 188/73.45 |
| 4,807,725 | 2/1989 | Weiler et al. | 188/73.44 |
| 5,226,510 | 7/1993 | Le Deit | 188/73.45 |
| 5,343,986 | 9/1994 | Rodgers et al. | 188/73.45 |

FOREIGN PATENT DOCUMENTS

| | | | |
|---|---|---|---|
| 0046432A2 | 2/1982 | European Pat. Off. . | |
| 0395460A1 | 10/1990 | European Pat. Off. . | |
| 2903154 | 8/1979 | Germany | 188/73.45 |
| 3641577A1 | 6/1987 | Germany . | |
| 9105358.7 | 10/1992 | Germany . | |
| 0144556 | 11/1979 | Japan | 188/73.45 |
| 8803614 | 5/1988 | WIPO | 188/73.45 |

*Primary Examiner*—Robert J. Oberleitner
*Assistant Examiner*—Chris Schwartz
*Attorney, Agent, or Firm*—Oblon, Spivak, McClelland, Maier & Neustadt

[57] ABSTRACT

A floating caliper brake comprises two bolts (16, 18) which are axially displaceable in bores (20, 22) to guide the floating caliper (10). One bolt/bore pair matches accurately, while the other bolt/bore pair fits together with relatively more clearance. It is provided that the bolt (18) which moves with relatively greater clearance in the bore (22) passes through a guide bushing (30) which is disposed in the bore (22) and the axial dimension of which is much smaller than the effective length of the bolt (18) in order thus to avoid rattling noise of the brake and yet be in a position to manufacture the brake inexpensively, for easy assembly and operational safety.

11 Claims, 2 Drawing Sheets

FLOATING CALIPER BRAKE, ESPECIALLY A FLOATING CALIPER SPOT TYPE DISC BRAKE

This application is a Continuation of application Ser. No. 08/220,519, filed on Mar. 31, 1994, now abandoned.

FIELD OF THE INVENTION

The outer instant invention relates to a floating caliper brake, especially a floating caliper spot type disc brake, comprising at least two bolts which are axially displaceable in bores to guide the floating caliper, the first bolt/bore pair being designed for precise fitting and the second bolt/bore pair with relatively greater clearance.

BACKGROUND OF THE INVENTION

The floating caliper of such a brake usually is guided by two pins or bolts so as to be movable with respect to a brake carrier member which is fixed to the respective vehicle. Those two bolts are axially displaceable in corresponding bores formed in the carrier member. As a rule, the bores in which the bolts slide in axial direction are each sealed by a gasket or packing of elastic material to prevent the entry of dirt and moisture and retain the lubricant which is provided in the bores.

A problem occurs with brakes of the kind described above in that manufacturing tolerances which cannot be avoided altogether, for instance, at the bore and bolt diameters and at the support faces for the bolts at the floating caliper may come to act together so unfortunately that the bolts can be moved only with difficulty or even get stuck in the bores. As a consequence, proper sliding guidance is no longer warranted and the functioning of the brake suffers. Specifically, axes of bores not extending precisely in parallel and bolt support faces at the floating caliper not being positioned precisely at right angles to the axes of the bores produce an angular error between the brake carrier member and the floating caliper resulting in at least one bolt becoming canted in its associated bore.

To solve that problem, it is known for example from EP 0 046 432 A2 and EP 0 395 460 A1 to design one of the bore/bolt pairings to have a relatively greater clearance so that any angular error which might result will not make the bolt difficult to move or to get jammed in the bore. With this solution of the problem, however, undesirable rattling may occur of that bolt which moves with relatively greater clearance in its bore in the event that the manufacturing tolerances which happen to come together are within the limits of the ideal measure so that there will be no angular deviation or but a very little one. Such rattling in particular develops while driving along bumpy roads or travelling on cobblestone pavement and often is considered quite annoying.

To avoid any undesirable rattling noise, it has been suggested in DE 91 05 358 U1 that one of the bolts should be crowned at least over a certain portion. Yet the production of such bolts with crowned portions creates its own problems due to the close tolerances which must be observed between the crowned portion and the bore. The solution of these problems makes the final product more expensive.

Another suggestion of how to avoid jamming of the bolt in the associated bore is known from DE 36 41 577 A1 according to which a guide means is provided between the bolt and the surrounding bore in order to allow some canting of the bolt without any disadvantageous consequences. The guide means consists of an inner convex member and a concave sleeve embracing that member. It is obvious that this solution is very complicated and, therefore, expensive.

SUMMARY OF THE INVENTION

It is the object of the invention to provide a floating caliper brake of the generic type specified with which the rattling noise described does not occur and yet the brake can be produced economically and assembled easily and furthermore operates reliably.

That object is met, in accordance with the invention, in a floating caliper brake of the kind defined initially in that the bolt moving with relatively greater clearance in the bore passes through a guide bushing which is disposed in the bore and the axial dimension of which is much smaller than the effective length of the bolt. The effective length of the bolt is understood to be the length formed for sliding movement of the bolt. With this solution, therefore, it is the guide bushing which provides the actual guidance of the bolt which moves with relatively greater clearance in its bore. Since the axial dimension of the guide bushing is small, as compared to the effective length of the bolt, any possible angular errors will not affect the proper functioning of the brake due to difficult movement or jamming even if there were a minor clearance between the guide bushing and the bolt not causing any rattling. The difficulty with the high degree of manufacturing accuracy is shifted to the guide bushing which is easier and cheaper to produce.

The axial dimension of the guide bushing preferably corresponds to from 10% to 25% of the effective length of the bolt. The clearance between the guide bushing and the bolt preferably is smaller than 0.2 mm. Extensive testing has shown that noticeable rattling no longer occurs when the clearance is less than 0.2 mm.

In a preferred embodiment of the invention the guide bushing is arranged in the area of that end of the bore which faces the corresponding bolt. This arrangement permits simple and inexpensive mounting of the guide bushing in the bore. The guide bushing preferably is slotted axially as that will prevent upsetting of the bushing material when the bushing is pressed into the bore. This tends to happen with an unslotted bushing and may result in undesired narrowing of the inner bushing diameter so that an intended minimum clearance between the bolt and the guide bushing is fallen short of.

It is especially preferred if the guide bushing is made of a highly resistant steel. As compared to a guide bushing made of less resistant steel, the axial dimension of the bushing can be selected smaller for the same stability.

BRIEF DESCRIPTION OF THE DRAWING

The invention will be described further, by way of example, with reference to the accompanying drawings, in which.

DESCRIPTION OF THE PREFERRED EMBODIMENT

Figure 1:
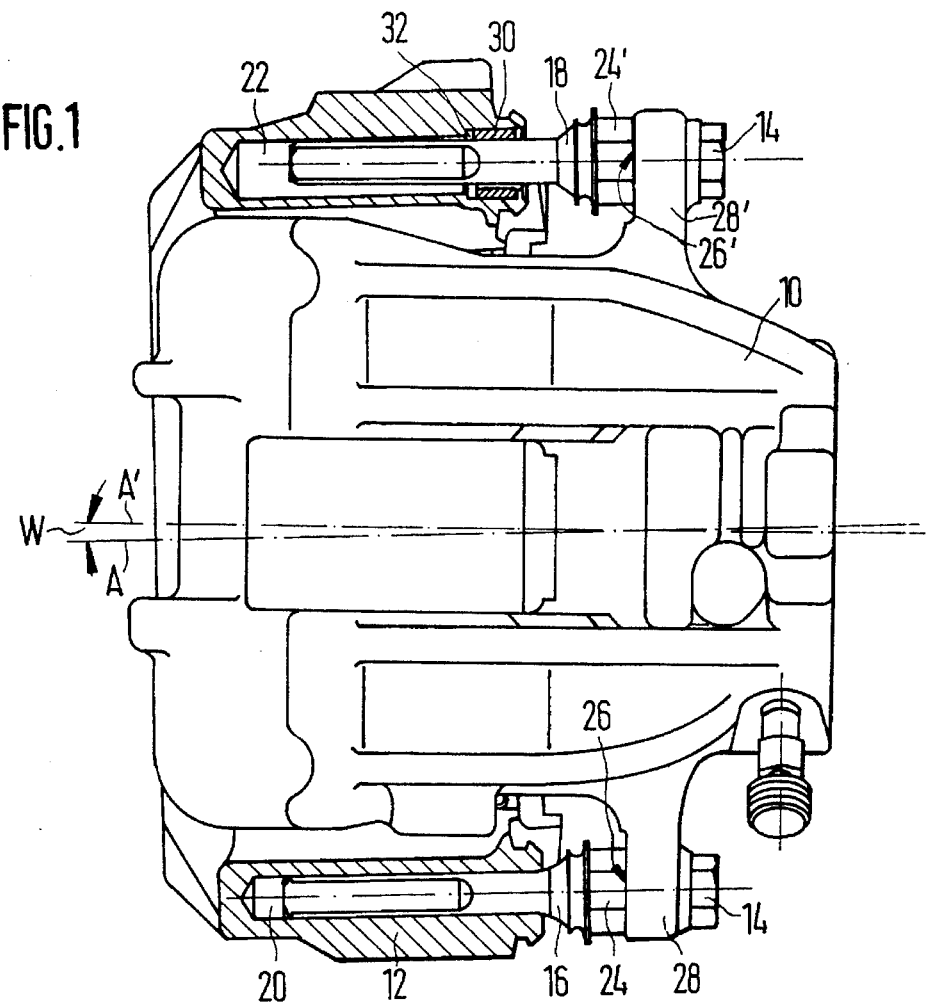
FIG. 1 is a top plan view of a floating caliper spot type disc brake comprising two bolt/bore pairs, showing the brake in a position it adopts when the friction linings are new.

FIG. 1 diagrammatically shows a floating caliper spot type disc brake for a motor vehicle, comprising a floating caliper 10 which straddles a brake disc (not shown) and is mounted for sliding displacement with respect to a brake carrier member 12 that is fixed to the vehicle. Two bolts 16, 18 extending into two bores 20, 22 formed in the carrier member 12 are secured to the floating caliper 10 by a screw 14 each. The floating caliper 10 thus can move to the right or left, as seen in FIG. 1, with respect to the carrier member 12 when the brake is actuated or released by a conventional actuating means not described in any greater detail here.

The lower pair in FIG. 1 of bolt 16 and bore 20 is layed out for such precise fitting as can be produced under economical aspects. In the instant case, the bolt 16 is made to an accuracy of ±0.025 mm and the bore to an accuracy of ±0.02 mm. The resulting minimum clearance is 0.06 mm and the maximum clearance is 0.15 mm between the bolt 16 and the bore 20.

Let us assume that a central axis A, indicated in FIG. 1, of the carrier member 12 extends precisely parallel to the axis of the bore 20. By its head 24, the bolt 16 rests against a face 26 which is to be precisely at right angles to the axis A and is presented by a fastening eye 28 projecting from the floating caliper 10. The floating caliper 10 thus would be guided for displacement exactly parallel to the axis A of the carrier member 12.

However, the face of the head 24 of the bolt 16 entering into contact with the abutment face 26 is not disposed precisely at a right angle with respect to the axis of the bolt 16, but instead suffers from some tolerance. Consequently, the floating caliper 10 is no longer guided exactly parallel to the axis A of the carrier member 12. Furthermore, there are tolerances also between the abutment face of the head 24' of the upper bolt 18 in FIG. 1 and the cooperating abutment face 26' formed at the fastening eye 28', and they add up to an angular error W between the axis A of the carrier member 12 and axis A' of the floating caliper 10. This angular error W, whose maximum is in the range of from ½°, to ¾°, is exaggerated in the drawing for the sake of clarity.

Due to the angular error W, the upper bolt 18 in FIG. 1 sits slantedly in the bore 22 with which it cooperates. For this reason the clearance between the bolt 18 and the bore 22 is relatively greater than the clearance described above between the bolt 16 and the bore 20 in order for the slanted bolt 18 not to cause difficulty in being moved or getting the brake jammed. Again, for better understanding, the inclined position of the bolt and the enlarged clearance are shown exaggerated in the drawings.

The guidance proper of the bolt 18 in the bore 22 is realized by a guide bushing 30 which is arranged in the end of the bore 22 facing the bolt 18, this end section 32 of the bore being wider and the bolt 18 passing through it.

Figure 2:
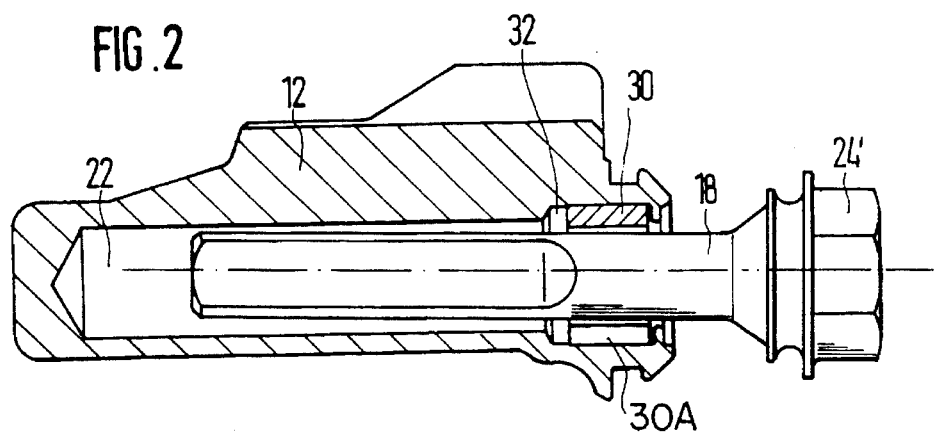
FIG. 2 is an enlarged presentation of the bolt/bore pair of FIG. 1 having the relatively greater clearance.

FIG. 2 shows the arrangement of the guide bushing 30 and the bolt 18 in the bore 22 on an enlarged scale. As can be seen in FIG. 2, there is clearance between the guide bushing 30 and the bolt 18 and that clearance is smaller than the clearance between the bolt 18 and the bore 22, depending on the diameter of the enlarged end section 32 as well as the outer and inner diameters of the guide bushing 30. The clearance is selected so that it will be between 0.06 mm and 0.19 mm. This minor clearance, which corresponds approximately to that between the bolt 16 and its bore 20, is sufficient to reliably suppress perceivable rattling noise.

Figure 3:
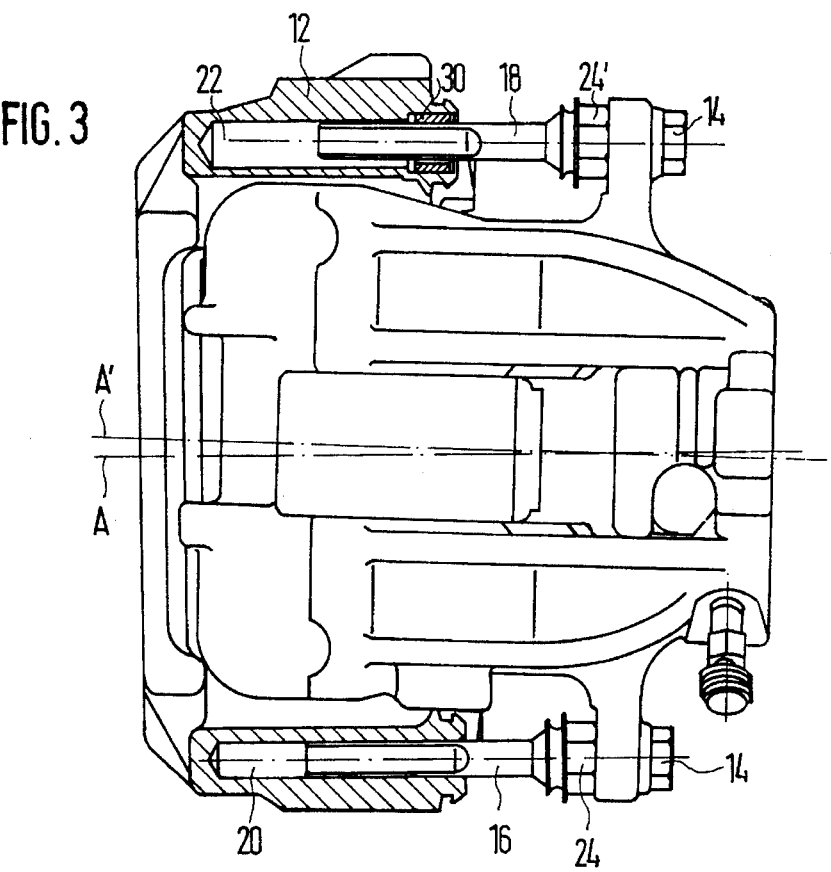
FIG. 3 is a top plan view of the floating caliper brake according to FIG. 1, yet showing the brake in a position it adopts when the friction linings are worn.
Figure 4:
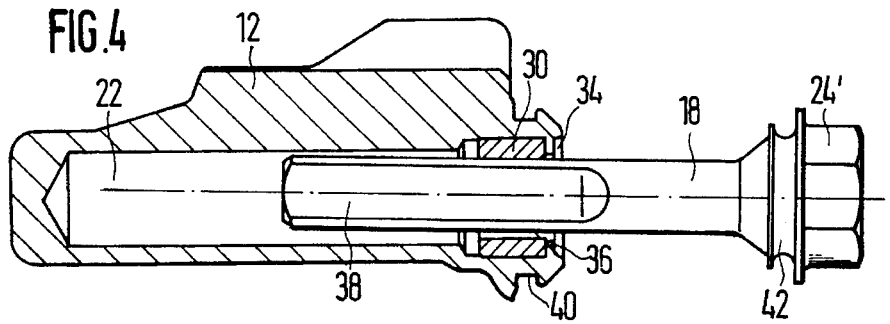
FIG. 4 is an enlarged presentation of the bolt/bore pair of FIG. 3 having the relatively greater clearance.

FIGS. 1 and 2 demonstrate a state of the brake when the friction linings are new or worn only a little. As the wear of the friction linings progresses, the floating caliper 10 shifts to the right in FIG. 1, i.e. the bolts 16, 18 slip more and more out of their bores 20, 22 until they reach their final positions shown in FIGS. 3 and 4. As shown particularly clearly in FIG. 4, the bolt 18 in its end position lies against the inner wall of the guide bushing 30. Any further slipping of the bolt 18 out of the bore 22 would be possible only by application of a greater force and ultimately would lead to jamming of the bolt 18 in the guide bushing 30. For this reason it is important that the axial dimension of the guide bushing 30 is selected in such a way that, with a given clearance between the guide bushing and the bolt, the bolt 18 touches the inside wall of the guide bushing 30, if at all, only when in operation the terminal positions are reached in the shifting distance of the floating caliper. The shifting distance of the floating caliper essentially results from the difference in thickness of the new outer friction lining and the maximum worn outer fricting lining. In the embodiment shown, the axial dimension of the guide bushing 30 corresponds to about 20% of the length of the bolt 18 formed as sliding portion.

Figure 5:
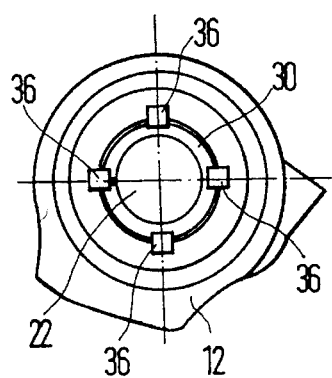
FIG. 5 is a top plan view of a guide bushing mounted in the corresponding bore.

The guide bushing 30 is pressed into the enlarged end section 32 of the bore 22. The guide bushing 30 is slotted with slot 30A in axial direction to permit easier and gentler assembly. Thus it can be pushed under slight radial compression and with minor pressure exerted in axial direction into the widened end section 32. Once introduced, it is biased resiliently against the inner wall of the end section 32. For further fixation of the guide bushing 30, four noses 36 (see FIG. 4) are calked inwardly out of an edge 34 which surrounds the free end of the bore 22. These noses extend partly over the corresponding face end of the guide bushing 30 and thus keep the guide bushing 30 in the end section 32 in form lock, preventing it from slipping out axially. As may be seen in FIG. 5, the noses 36 are mutually offset by 90°.

Both the bores 20, 22 and the bolts 16, 18 are given a good greasing before the bolts are pushed into the bores. The grease film then keeps the bolts approximately centered in the bores while they are being pushed in. Recesses 38 with which the bolts 16, 18 are formed serve as grease pockets and permit the air to escape as the bolts are being pushed in. Once the bolts have been pushed in, bellows (not shown) of elastic material are secured in grooves 40, 42 formed in the carrier member 12 and in the bolts 16, 18 (see FIG. 4) to protect the sliding guides from contamination and prevent the escape of lubricant. Thereupon, the floating caliper 10 is fixed on the bolts 16, 18 by means of the screws 14 which engage in internal threads (not shown) formed in the bolts.

What is claimed is:

1. A floating caliper brake, comprising at least two bolts which are axially displaceable in bores having inner and outer ends to guide the floating caliper, a first bolt/bore being designed for precise fitting and a second bolt/bore pair with relatively greater clearance between the second bolt and its bore, wherein the second bolt, moving with relatively greater clearance in the second bore passes with clearance through a guide bushing which is disposed in the second bore adjacent its outer end, the axial dimension of the guide bushing being much smaller than the effective length of the second bolt and the effective length of the second bore.

2. The floating caliper brake as claimed in claim 1, characterized in that the axial dimension of the guide bushing corresponds to from 10% to 25% of the effective length of the second bolt.

3. The floating caliper brake as claimed in claim 2, characterized in the clearance between the guide bushing and the bolt second is smaller than 0.2 mm.

4. The floating caliper brake as claimed in claim 2, characterized in that the guide bushing is arranged in the area of that end of the second bore which faces the second bolt.

5. The floating caliper brake as claimed in claim 1, characterized in that the second bolt passes through the guide bushing with clearance, the clearance between the guide bushing and the second bolt being smaller than 0.2 mm.

6. The floating caliper brake as claimed in claim 5, characterized in that the guide bushing is arranged in the area of that end of the second bore which faces the second bolt.

7. The floating caliper brake as claimed in claim 1, characterized in that the second bolt has inner and outer ends and includes a bolt head at its outer end, the guide bushing being arranged in the area of that end of the second bore which faces the bolt head.

8. The floating caliper brake as claimed in claim 1, characterized in that the guide bushing is slotted axially.

9. The floating caliper brake as claimed in claim 1, characterized in that the guide bushing is made of a highly resistant steel.

10. The floating caliper brake as claimed in claim 1 wherein a clearance between said guide bushing and said second bolt passing therethrough is smaller than a clearance between said other bolt and said second bore.

11. A floating caliper brake comprising at least two bolts which are axially displaceable in bores having inner and outer ends to guide the floating caliper, a first bolt/bore pair being designed for precise fitting and a second bolt/bore pair with relatively greater clearance between the second bolt and its bore, a guide bushing disposed in the second bore adjacent its outer end, said second bolt passing through said guide bushing, wherein the axial dimension of said bushing is much smaller than the effective length of the second bolt and wherein said first bore lacks a guide bushing through which said first bolt passes.

* * * * *

UNITED STATES PATENT AND TRADEMARK OFFICE
CERTIFICATE OF CORRECTION

PATENT NO. : 5,526,904
DATED : JUNE 18, 1996
INVENTOR(S) : MICHAEL WALDEN ET AL

It is certified that error appears in the above-indentified patent and that said Letters Patent is hereby corrected as shown below:

IN THE CLAIMS

Claim 3, line 3, please delete "and the bolt second"

and insert --and the second bolt--.

Claim 10, line 4, please delete "said other bolt"

and insert --said second bolt--.

Signed and Sealed this

Twentieth Day of May, 1997

Attest:

BRUCE LEHMAN

Attesting Officer

Commissioner of Patents and Trademarks